April 3, 1951  C. FUMAGALLI  2,547,636
WINDMILL ELECTRIC GENERATING AND STORAGE
SYSTEM, INCLUDING CONTROLLING MEANS
Filed Dec. 11, 1946  2 Sheets-Sheet 2
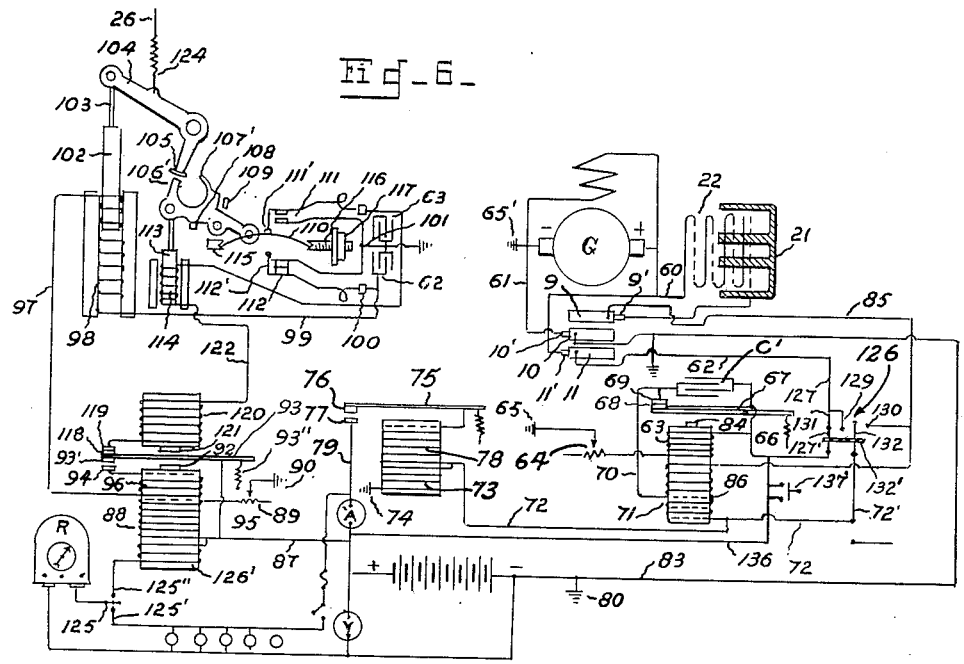
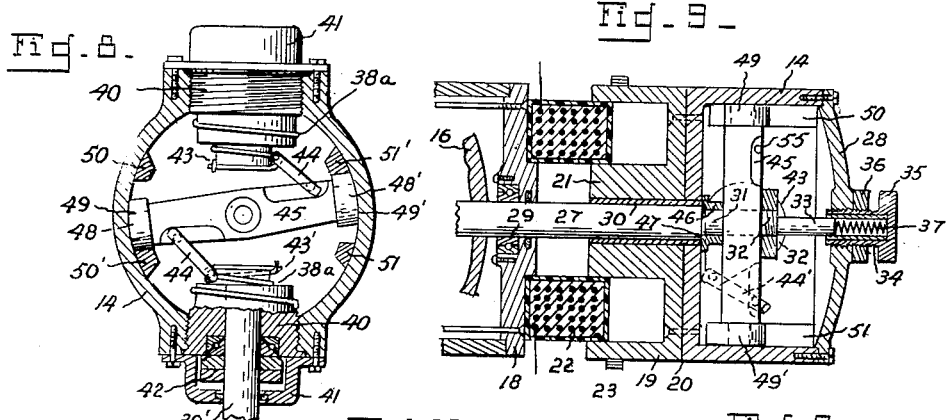
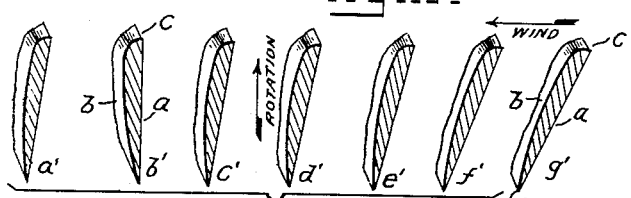
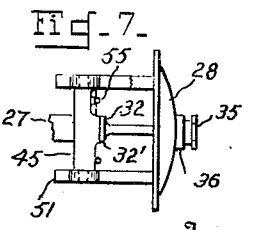
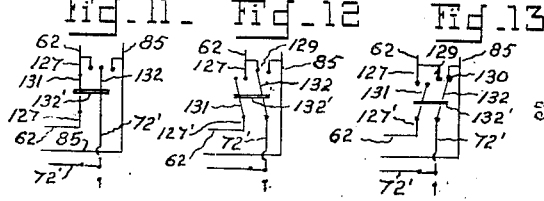
Inventor
Charles Fumagalli,
By C. C. Hines,
Attorney.

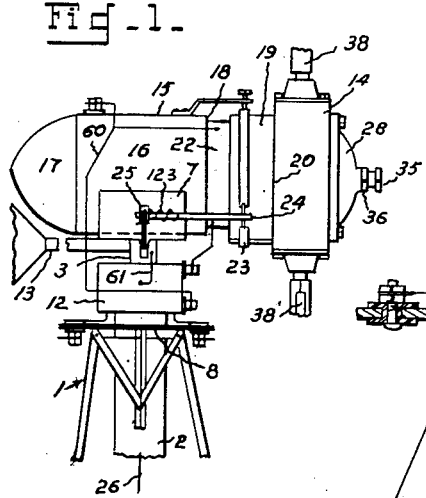
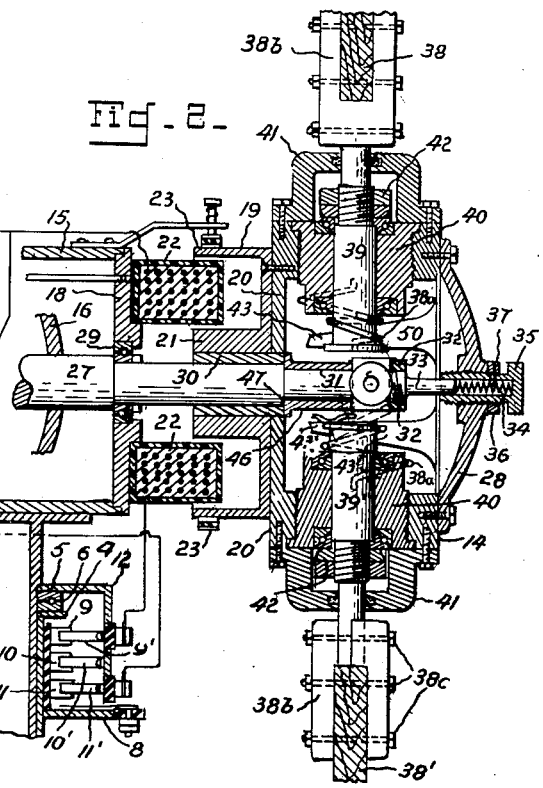
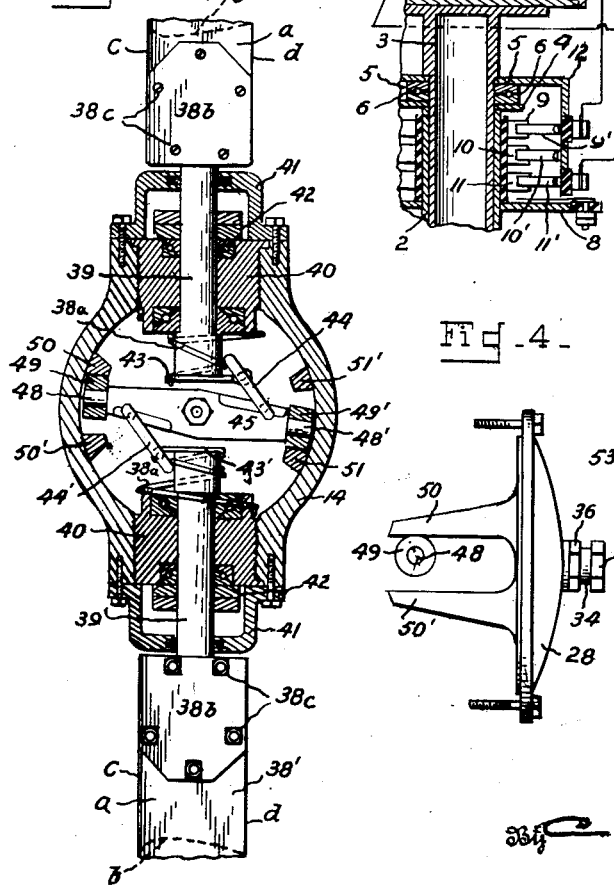
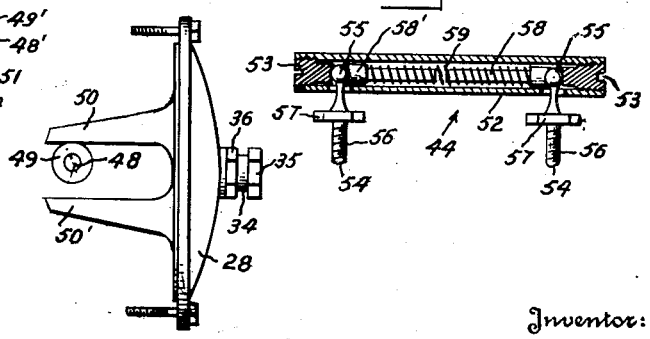

Patented Apr. 3, 1951

2,547,636

UNITED STATES PATENT OFFICE 2,547,636

WINDMILL ELECTRIC GENERATING AND STORAGE SYSTEM, INCLUDING CONTROLLING MEANS

Charles Fumagalli, Guatemala City, Guatemala

Application December 11, 1946, Serial No. 715,552

28 Claims. (Cl. 290—44)

This invention relates to windmill driven electrical generating and storage systems for generating and storing electricity for battery charging, power, lighting, radio and other purposes in a safe, reliable, efficient and inexpensive manner.

One object of the invention is to provide a windmill driven electric generating system for generating and furnishing electric current for battery charging, lighting and power purposes which is simple and adapted to be manufactured and sold at low cost, which is reliable and efficient in action, and which is automatically controlled to furnish an adequate supply of current at all times and to prevent damage to the working parts thereof.

Another object of the invention is to provide a windmill propeller structure which is easy starting into running action at a desired powerful starting pitch which may be varied as required to take care of starting into function a heavy machine.

Still another object of the invention is to provide a windmill propeller structure which automatically shifts to a determined pitch for high starting power.

Still another object of the invention is to provide a windmill propeller structure which, when the generator is set into action, will, through electrical and mechanical means, shift the propeller from a powerful starting pitch into a high speed pick up and running pitch for high efficiency, preferably at an 0° pitch, or any desired and suitable pitch to operate at certain speeds.

Another object of the invention is to provide a windmill structure which involves a novel construction of transmission for automatically controlling the propeller pitch according to wind speed in order to maintain a constant propeller speed regardless of wind velocities.

Another object of the invention is to provide a silent running propeller operating without the well known humming noise that occurs in standard propellers when the wind reaches high velocities.

Still another object of the invention is to provide an automatic means of starting and stopping the windmill when charge conditions or circuit requirements demand it, in order to maintain a battery at full charge, in the safest and most efficient manner without the need of any person's attention.

Still another object of the invention is to provide a very simple efficient, inexpensive and easy to understand, novel type of starting and stopping mechanism automatically controlled by battery conditions and circuit demands.

Still another object of the invention is to provide simple means, such as a fingertip push button, to instantly release the brake of the machine and start the generator into action.

Still another object of the invention is to provide simple and automatic means to stop the machine when switching on a radio to avoid generator interference.

Still another object of the invention is to provide means acting under wind velocities and coacting electrical means to automatically control the speed of the propeller and the charging rate of the generator in order to exactly meet battery requirements irrespective of the speed of the wind.

Still another object of the invention is to provide means of setting the propeller to operate at any required top speed and to enable the propeller to work at its maximum efficiency at low wind speeds until it reaches its fixed top speed and to maintain such top speed even in the presence of high wind velocities.

Still another object of the invention is to provide a novel means in the form of a three position switch for switching the prime mover controlling apparatus on and off so as (1) to control the speed of the propeller and the charging rate through the action of mechanical and electrical means, depending on the state of charge of the battery and circuit demands, (2) to operate the machine for charging actions controlled by mechanical and electrical means but not affected by the state of charge of the battery or circuit demands, and (3) to control the propeller speed solely by mechanical means independent of the electrical controlling means.

Still another object of the invention is to provide an electrical generating windmill structure which by mechanical control means may be maintained at a constant speed R. P. M. in irregular winds or winds of high velocities and capable of safely working in winds of, say, from 20 M. P. H. up to very severe winds or gales, without damage to the structure, and which may be used in aircraft for electrical generating purposes at all flying speeds.

Still another object of the invention is to provide electrical means for automatically controlling the speed of the propeller according to the state of battery charge or the circuit needs, and to provide an exact charging rate as the battery requires to be charged in a safe manner up to the point of complete charge.

Still another object of the invention is to provide a control means, including electrical control means, for securing a predetermined charging rate by automatically controlling the speed of the propeller, no matter what may be the speed of the wind.

Still another object of the invention is to provide a windmill generator which will normally operate efficiently to give a high rate of charge, combined with means for lowering said charging rate by electrically controlling the propeller through a pitch change, lowering the speed of the propeller, so as to avoid the use of a shunt resistance and its disadvantages.

Still another object of the invention is to provide means enabling a high voltage generator to be used to charge a low voltage battery, for example, using a 32 volt generator to charge a 6 volt battery and by the same means controlling the charge of said 6 volt battery at a high or low charging rate.

With these and other objects in view, the invention consists of the novel features of construction, combination and arrangement of parts, hereinafter fully described and claimed, and as shown in the accompanying drawings, in which:

Figure 1 is a view in elevation of a part of a windmill tower and a windmill head and parts of a control mechanism embodying my invention.

Figure 2 is a vertical longitudinal section through the windmill head, showing the propeller and mechanical controller in normal position.

Figure 3 is a vertical transverse section through the parts shown in Figure 2 showing the transmission in one of its controlling and driving positions.

Figure 4 is a side view of the head of the propeller casing and certain associated parts.

Figure 5 is a sectional view of one of the crank links.

Figure 6 is a diagram of the electric circuit.

Figure 7 is a plan view of the parts shown in Figure 4.

Figure 8 is a view similar to Figure 3 showing the transmission in its other controlling and driving position.

Figure 9 is a horizontal transverse section through the propeller head and associated parts.

Figure 10 is a view exemplificatively showing the starting and running position of a propeller blade and its variable governing positions under increasing wind pressures.

Figures 11, 12 and 13 are views of the double throw controlling switch, showing different positions thereof.

Referring now more particularly to the drawings, 1 designates a windmill frame or tower carrying an outer stationary shaft 2 and an inner shaft 3 rotatable therein, said shafts having fixed thereto turntable members 4 and 5 between which are interposed antifraction bearing 6, and on which shaft 3 the turntable head 7 is mounted so as to be rotatably movable to maintain itself normally in the path of the wind. As shown, the shaft 2 or tower 1 carries a junction plate 8, and mounted on said shaft 2 is a set of collector rings 9, 10 and 11 engaged by brushes 9', 10' and 11' mounted on an inverted cup-shaped member 12 fixed to and rotatable with the shaft 3, said members forming with the plate 8 a casing or enclosure for the rings and brushes and a support for their binding posts and associated electrical connections. A tail vane 13 is suitably mounted on the shaft 3 or head 7 and acts as a surface to normally keep the head facing toward the wind.

The windmill head is in the form of a more or less streamlined body or casing comprising a head casing section 14, a casing section 15 enclosing the generator 16, a conoidal rear end portion or cap 17, a closure head or partition 18 at the forward end of the section 15, and a telescopic coupling connection between the sections 14 and 15, said telescopic connection consisting of a cup-shaped armature member 19 secured to the rear wall 20 of the section 14, and having a hub or sleeve portion 21 forming a solenoid core, and an annular solenoid coil 22 secured to the head 18 and telescopically enclosing the core 21 and telescopically fitting within the member 19. Member 19 is preferably formed with the core as a unit and both made of magnetic metal so that members 19 and 21 act as a solenoid armature and so that the attractive force of the coil on the members 19 and core 21 may be utilized to the fullest advantage to pull or draw the parts 14 and 19 rearward or toward casing section 15 when the coil is energized. The member 19 also serves as a brake drum externally engageable by a spring retracted split brake band 23 supported by the casing section 15, the ends of which band are coupled to a rock shaft 24 actuable by a lever 25 to contract and apply the band. The lever 25 is connected by a cable 26 to an electric controller in a charging and storage circuit C so as to operate to apply the brake at a time and in the manner hereinafter described.

The forward or head casing section 14 forms the head and an enclosure for the forward portion of the generator drive shaft 27 and parts of the transmission, propeller and mechanical propeller adjusting or control means. As shown, the casing 14 comprises an annular casing body closed at the rear by the wall 20 and at the front by a detachable cover 28. The shaft 27, which forms part of or is coupled at its rear end to the generator armature, extends into the casing 14 through an anti-friction bearing 29 on the head 18 and a bearing bushing 30 fitted in the armature 21 and wall 20 and is provided within the casing 14 with a reduced portion 31 having a threaded surface 32 and a reduced terminal or tip 33. The tip 33 extends into the chamber of a hollow regulating screw 34 fitted in a threaded opening at the center of the cover 28 and having at its outer end an adjusting head 35 and carrying a jamb nut 36, whereby it may be adjusted and fixed in adjusted position. In said screw is arranged a spring 37 against which the tip 33 bears. This spring operates to maintain the casing 14 in a predetermined forward position and to oppose a yielding resistance to rearward sliding movement of said casing. This resistance may be varied by adjustment of the bolt, which serves with the spring as a controller whereby the degree of adjustment of the propeller and its allowable maximum and minimum speeds may be set or regulated as occasion may require.

The propeller per se and the transmission and propeller adjusting means comprises a pair or more of diametrically disposed propeller blades 38, 38' secured by clamping members 38b and bolts 38c to shafts 39, 39' journaled at opposite sides of the casing 14 in anti-friction bearings arranged in bearing sleeves 40 secured in place by brackets 41 and adjustable to take up wear by adjusting nuts 42. The blades are axially adjustable to reduce their pitch for speed increasing actions against the resistance of coil springs 38a which act in conjunction with spring 37 to maintain them in initial position. At their inner ends the shafts 39, 39' are provided with eccentric or crank flanges or projections 43, 43' which are coupled by crank links 44, 44' to the oppositely extending arms of a rocker bar type of transverse transmission and adjusting lever 45. This bar or lever is fixed to the reduced portion 31 of the shaft between a spacing collar 46, disposed between the bar and a shoulder 47 at the front end of the shaft portion 31, and a nut 32' engaging the threaded surface 32 of the shaft. The lever 45 is adapted to be rocked with the shaft clockwise and counterclockwise and is provided at the free ends of its arms with spindles 48, 48' on which are journaled rollers 49, 49'. These rollers are disposed in the spaces between pairs of track and stop rails 50, 50', 51, 51' extending longitudinally at opposite sides of the casing and carried by and extending inwardly from the cover 28, on which rollers the track bars may run in the backward and forward sliding movements of the casing 14 and propeller. As shown in Figures 3 and 8, the bar or lever 45 is rockable to two positions, one in which the rollers 49, 49' engage rails 50 and 51, and the other one in which the rollers 49, 49' engage rails 50' and 51', the contact of the rollers with the rails limiting the swing of the lever 45 for such adjusting movements, the bar forming in these positions a transmission element to transmit rotary motion from the propeller to the shaft while allowing free backward and forward sliding motion of the propeller on and relative to the shaft.

The crank links 44, 44' couple the propeller shafts to the lever 45 to drive the generator shaft at starting and idling speeds and to control the pitch adjusting movements of the propeller blades and to hold said blades in their adjusted positions. Motion for these adjustments is transmitted to the links by the longitudinal sliding movements of the propeller casing and propeller as a whole and through the rocking movements of lever 45, and the links in turn transmit adjusting movements to the propeller blades by the action of lever 45 on the propeller shafts 39, 39'. Each link is constructed to permit actuating movements of its pivotal connections and to maintain a proper distance therebetween. As shown particularly in Figure 5, each link consists of a tube or cylinder 52 closed at its ends by threaded adjusting members 53 and having side openings near its ends through which project the neck portions of pivot members 54, each having a spherical head 55 located in the head and engaging the adjacent member 53, and each having a threaded outer end 56 and manipulating and stop flange or head 57, the threaded ends of the pivot members of the respective links 44, 44' connecting said members with the arms of the lever 45 and eccentric or crank shafts 39 and 39'. Disposed in each tube 52 are plungers 58 having headed outer ends 58' contacting with the heads 55 of the pivot members 54 and surrounded by a spring 59 adapting the plungers to yield and allow swinging movements of the pivot members and their relative distance adjustments to allow swinging movements of the link as a whole and to keep the heads 55 of the pivot members in contact with the members and heads 58', which are concaved to form bearing surfaces. Thus, when the propeller hub casing 14 and blades 38, 38' are rotating the lever 45 and the links 44, 44' form a transmission or driving connection between the propeller shafts and the generator driving shaft and constitute also a means operating through adjustment of the regulating screw 34 and the sliding movements of the propeller and rockable movements of lever 45 to adjust the propeller blades to different working angles or starting and running positions.

The propeller blades 38, 38' are or may be of special form to secure certain desirable working functions and advantages. As shown, each blade is cross-sectionally curved to conform substantially to a conventional shape of an airplane wing between its leading and trailing edges, and has a front longitudinally and transversely flat reaction surface $a$, a more or less parabolically curved rarefaction surface $b$, a leading edge $c$, and a trailing edge $d$. Figures 3 and 8 of the drawings in connection with the indicated blade positions $a'-g'$, inclusive, of Figure 10 illustrate the adjustment of the transmission-controller and the propeller blades in starting position, in running position between different running wind speeds, and in various positions taken by the blades in governing them as necessary at different higher wind speeds to compensate for different wind speeds or pressures in order to maintain a safe and constant windmill speed. Figure 8 shows the position of lever 45 in a running action with the blades in position $b'$ for normal running in slow winds and certain medium high speed wind velocities, and Fig. 10 shows the blades in positions $c'$, $d'$, $e'$, $f'$, $g'$ under governing actions at high or stormy wind velocities of different degrees. Figure 10 also shows at $a'$ the position of the blades for a windmill starting action, it being understood that the lever 45 and blades 38, 38', Fig. 3 are normally held in starting position by the action of springs 38a and that the propeller rotates in a clockwise direction. In such normal starting position the blades are disposed with their reaction faces $a$ arranged at a positive angle of from 8 to 10° (position $a'$ of Figure 10), or any suitable or required starting angle position, as a result of which the wind, acting aerodynamically on faces $a$ and flowing toward the trailing edges $d$, will exert a powerful force to drive the propeller and start the generator into action. This starting angle or pitch of the propeller blades may be varied and regulated within fixed and efficient starting limits by axial (rotative) adjustment of the blades relative to and on their shafts 39, 39' and clamping them thereto in adjusted position by means of the clamping members 38b and bolts 38c. This normal or fixed propeller angle $a'$ for a starting action and driving the generator at idling speeds is maintained by springs 38a after the windmill has been started into rotation and until the generator reaches a certain speed and builds up a certain voltage which causes a certain torque on its shaft 27 sufficient to overcome the tension of the springs 38a, whereupon bar 45 and the propeller blades are shifted to the normal running position $b'$. Figure 3 shows the normal starting position $a'$ of the blades in which the bar 45 and the rollers 49, 49' are held by the tension of the springs 38a in position for a clockwise starting action, the rollers 49 and 49' resting on rails or track members 50 and 51, and Figure 8 shows the running position in which bar 45 is shifted into engagement with rails 50' and 51' in which the blades assume position $b'$ as an initial position and are subject to the angle shift positions shown by pitch angles $c'$ to $g'$ at different high wind velocities to govern the propeller at top speeds.

It will be understood that the opposed torque of generator on shaft 27 causes the shaft 27 and the bar 45 to be temporarily retarded in their rotating motion, so that the shaft 27, bar 45, and rollers 49 and 49' are shifted to the positions shown in Figure 8, which shows the transmission parts arranged to decrease the pitch of the propeller blades for a high speed and power running action (Figure 10, blade position b') transmitting high rotative power to the generator against the opposed generated torque. In this position of the parts the high rotative power and speed are transmitted from the propeller to the generator shaft 27 through the track members 51' and 50', rollers 49, 49', and bar 45. The above-described arrangement of the generator parts places the tension springs 38a under high tension tending to shift them back to the starting angle position a' shown in Figs. 10 and 3, when the speed of the generator is reduced to a low speed and the torque disappears or when the windmill stops or is stopped by action of the brake, in order to set the propeller for an easy and powerful starting action through the tension of the springs 38a.

As the generator is generating current and the propeller is set to operate at a speed fixed by the torque of said generator, the propeller varies its action at different wind speeds to drive the generator at a high or a low charging rate as circumstances may require. Normally the parts pass smoothly from the starting position (Figure 3, and a' Figure 10) to the running and idling driving position (Figures 8, b', and Figure 10) in which running position the propeller will turn at a variable R. P. M. calculated to operate the generator at a high charging rate, varying more or less from 6 to 20 M. P. H. wind speed. The propeller blades maintain the running position shown in Figure 8, and b' Figure 10 at these wind speeds and in such position the blades are disposed at a zero angle or slight negative or other fixed, efficient high speed running angle, as the flow of the air will be over the leading edges c and rarefaction airfoil surfaces b, so that a vacuum effect is produced to drive the propeller at the maximum speed under wind speeds of from 6 to 20 M. P. H. From this point on higher pressures of the wind on the propeller causing rearward sliding movements of the propeller head will cause mechanical shifting of the blades at, say, wind pressures of, for example, from 20 to 80 or more M. P. H. to the lower speed ratio angle positions shown and indicated at c', d', e', f' or g' in Figure 10 or further increased lower speed angle positions, decreasing the speed efficiency of the propeller to compensate for the higher speed of the wind, but maintaining the predetermined windmill speed (say, 20 M. P. H. windmill speed R. P. M.) to drive the generator at a more or less constant charging rate. The action of the windmill will be mechanically controlled in this manner through the control means so far described until conditions in the battery and electric circuit require a change in the charging rate or a stoppage of the apparatus, when the apparatus will then also be electrically controlled.

It will be understood, of course, that the top speed limit adjustment of the blades may be regulated by means of the regulator screw 34, and that, beginning with the zero angle b' shown in Fig. 10, or an approximate angle, and continuing throughout the slower angles shown at c' to g' in Figure 10, the speed will be governed by the pitch arrangement of angles of incidence of the blades whereby the efficiency of the propeller is progressively decreased as and proportionally to increasing wind speeds and the washout actions or degrees of spilling of the air from the blades, by means of which the effective speed force of the wind on the blades is progressively reduced throughout progressive high wind speed pressures to maintain a constant high speed. The solenoid 22—21 acts under certain conditions to slide the propeller head rearwardly to counteract the tension of the top speed regulator spring 37 of regulator screw 34 to assist in shifting the blades to reduce the R. P. M. of the propeller at any determined speed of the wind to cut down the rate of charge of the generator as required by conditions in the battery or electric circuit C supplied with current by the generator. As the expansion of spring 37 is reduced by the wind pressure independently of as well as conjointly with the power pull of the solenoid 21, 22, it cooperates with the pressure of the wind so that the speed of the propeller is reduced at increasingly high wind speeds and pressures to a lowered top speed R. P. M. and the generator charge rate is lowered in proportion to the speed of the slowed propeller. In other words, the allowable top speed of the propeller is under high wind pressures automatically maintained at a predetermined high R. P. M. by the mechanical controlling means, and at variable speeds under normal wind running conditions, until conditions in the circuit C require a change so when the solenoid is energized by the current under normal running or governing conditions, the speed of the propeller is reduced from a high speed to a medium top R. P. M. governing speed.

Electrical controlling means are provided for cooperation with the mechanical controlling means to reduce the charging rate of the generator or to stop the windmill when conditions in the circuit C require either of these actions. The plus and minus poles of the generator are connected by conductors 60 and 61, respectively, to the collector rings 11 and 10 through the brushes 11' and 10', and one end of the coil 22 is connected to the conductor 60 and the other end thereof to the collector ring 9 by means of brush 9'. The collector rings are connected with the parts of the circuit C and the battery and associated parts and controllers therein in the manner which will now be set forth in connection with the operation of the parts normally and under other conditions in the charging action and the circuit.

The generator G generates a voltage which causes a current to flow through positive conductor 60 through brush 11', collector ring 11, conductor 62, to voltage coil 63 via the switch member 131 of a double pole, double throw switch 126 which normally connects conductor 62 in series with a conductor 66 connected to coil 63 and to an associated armature 67, and then through adjustable resistance 64 to ground 65 and back to negative ground 65' of the generator. The switch 126 and its functions are hereinafter more fully described. The same current splits and also flows through conductor 66 via contact points 68, 69, conductor 70, coil 71 and conductor 72 to and through cut-out relay voltage or closing coil 73 and to ground 74, back to generator negative ground 65', attracting cut-out armature 75 and closing the current relay contact points 76 and 77, so that current flows from the positive of the generator through brush 11' collector ring 11, conductor 62, when switch member 131 is arranged in the normal position shown in Figs. 6 and 11 to connect two conductor branches 127, 127' to govern the charging rate through the action of the compound regulator and cooperating parts of the electric circuit according to the state of charge of the battery, the amperage flowing through the switch member 131 to and through conductor 66 to contact points 68 and 69, conductor 70, heavy coil 71, conductor 72, relay heavy coil 78, armature 75, contacts 76 and 77 through conductor 79, ammeter A, to the battery positive and through its elements to battery negative ground 89 and back to generator ground 65' or through main negative conductor 83 back to the generator G. As during the charging process the voltage of the battery and circuit gradually increases, the coil 63 develops a higher magnetic attractive force on its electromagnet core 84, and also amperage passing through the amperage coil 71 generates an attractive magnetic force acting on the same core 84, increasing its magnetic force to a high degree but not sufficient to attract the magnetic armature 67. However, as at this time the voltage in the battery circuit is constantly increasing, and as, when said voltage reaches certain high degree at a certain high state of charge of the battery, a continued high charging rate may cause damage to said battery, the rate of charge should be reduced. Under this condition the magnetic force of coil 63 is increased until a greater intensity is reached, which still is not sufficient to attract the armature 67, but as a high amperage is energizing the heavy current coil 71, it coacts with voltage coil 63 to energize the core 84 to such a magnetic force as to attract the armature 67, breaking the electrical contact at points 68 and 69. The condenser c' is connected in parallel to the contacts 68 and 69 of the compound regulator formed by the coils 63, 71, core 84 and associated parts so as to prevent sparking when said contacts break the circuit.

When the contact is broken at points 68 and 69, current from the battery can no longer pass to coil 71 by means of this compound regulator circuit, on account of the open circuit caused by the separation of contact points 68 and 69, but instantly the generator increases the voltage passing to coil 63 through conductor 62 which energizes coil 63 to a higher degree whereby the armature 67 is held attracted, keeping contacts 68 and 69 separated, so that no current can flow from the generator via conductor 70 to the battery. At this time, however, current flows through coil 22, collector ring 9 and wire 85 to regulator coil 86, which is connected to coil 71, so that both coils 86 and 71 are connected and the amperage turns are increased to hold the armature 67 in its open circuit position at a lower rate of amperage generated by the slowered generator, the current thence flowing by way of the conductor 72 and associated means to the battery and back to the generator negative to continue the battery charging process at a lowered charging rate. The voltage at coil 63 increases to a certain degree on the flow of current by way of the coil 22 and above described course of travel of the current to the battery, but as the coil 22 is energized it attracts its core and the propeller head which slide back on the drive shaft 27 causing the propeller to change its pitch, lowering the speed and the charging rate of the generator regardless of any prevailing high velocity state of the wind, so that the propeller will never overspeed from medium speed. When the propeller reaches its top electrically governed speed, if the wind diminishes below that required to drive the propeller to maintain its top medium speed, the generator charging rate is momentarily reduced, reducing the attractive force of coil 22, allowing the top speed adjusting spring 37 to force the propeller head forward, in cooperation with the suction created by the propeller owing to its excessive pitch, so that the propeller itself suctions wind to meet the exact speed of the wind at a higher speed pitch angle to balance the speed of the wind proportionately to the angle of the propeller and the attractive force of the solenoid, thus shifting the propeller blades to a pitch in balanced relation to the speed of the prevailing wind in order to maintain a lowered but constant speed and low charging rate.

If the wind speed lowers to the point at which the propeller can no longer maintain its medium speed, and as the generator thereupon lowers its charging rate, the magnetic pull of coil 22 on the armature 21, and that of coils 63 and 86 on armature 67, is reduced, and the armature 67 closes contacts 68, 69, whereby the flow of current to the coil 22 is reduced to the minimum on account of the less resistance offered by the circuit of lead 62 to the flow of current to the battery circuit. As long as the resistance of coil 22 against the sliding movement of the propeller head to a higher speed position prevails the lower constant generating rate will be maintained, but as the battery is constantly being charged the voltage will gradually be increased in the battery circuit so the attractive force of the compound regulator voltage coil 63 will be gradually increased up to the point at which it operates the armature 67 to break contacts 68, 69, less magnetic power of the coil 71 being required under these conditions for co-action with coil 63 to attract the armature 67 in order to break the circuit at points 68, 69, so that as less amperage flow through coil 71 will be required in such operation to open contacts 68, 69, the circuit including coil 22 will function to secure a lower charging rate of the generator and control the speed of the propeller more easily under low or high wind speeds and pressures. As the voltage in the circuit increases in a fast charging action up to a point at which the battery is nearly but not fully charged the propeller will be rendered responsive to a governing action by the solenoid coil 22 for adjustment to a position to drive the generator at a low charging rate, as, when the voltage is high, less amperage for co-operation with the voltage will be required to energize the coil 63 so that it will attract the armature 67 to break the circuit at contacts 68 and 69, and thereby throw into action the electrical means of which coil 22 forms a part for arbitrarily governing the speed of the propeller by interrupting the flow of current through the conductor 62 and causing the current to flow through the coil 22 and conductor 85. By this means the power of the coil 22 will be increased and through its action the propeller will be adjusted to its running position in which it operates at its highest efficiency in low speed winds, whereby the generator will be operated to finish charging the battery to a full state of charge at a low charging rate.

It will be noted that I do not employ a shunt resistance to control the charging rate of the generator, the use of which would render the generator difficult of control and inefficient when driven by a propeller operating at low wind speeds and especially when it is necessary to have the generator operate at a low charging rate. In my system the generator will be controlled by the described mechanical means so as to be efficiently operated at any and all wind speeds to charge the battery at a high charging rate up to a certain high state of charge of the battery, after which the system will electrically control the propeller speed arbitrarily to operate the generator at a reduced but effective charging rate until the battery is fully charged, no matter how high or how low the speed of the wind may be.

An unnecessary continuation of charging of an already fully charged battery is harmful, and also a continuation of running a generator on a fully charged battery represents a wearing out of parts without any advantages, as a fully charged battery cannot store any more current than it is designed to store. So in order to automatically stop or start the windmill as required by the state of charge of the battery and the circuit demands, I employ novel electrical and mechanical means for performing these operations which I shall now proceed to describe.

Assuming that the windmill is running and battery fully charged, the stopping action is as follows:

From the positive of the battery, the wire 87 takes current to energize a coil 88, from which the current passes through the adjustable resistance 89 and ground 90 back to the battery negative 80. When the voltage of the battery reaches its full charge condition, governed by previous adjustment of variable resistance 89, coil 88 is energized and to its core 92 attracts the spring released magnetic armature 93, thus closing the circuit at contact points 93' and 94, so that through the conductors 87 and 95 a certain amount of amperage flows from the positive of the battery through the armature 93, contacts 93' and 94 through the heavy coil 96 which exerts a strong magnetic pull on armature 93 to hold contact points 93' and 94 tight and preventing heating and sparking at said contact points, the current continuing its travel by wire 97 through solenoid coil 98 and by lead 99 to insulated electrical break and make contact switch 100 and through grounded switch members 101 back to battery negative 80. The current passing through the solenoid coil 98 magnetically attracts its armature 102, which is coupled at one end by a connecting rod 103 to a pivoted bell-crank lever 104 connected to the brake operating cable 26. Lever 104 is provided at its other end with a projection 105 adapted to be engaged by the hooked end 106 of a pivoted latch 107 movable between stops 108 and 109 and pivotally connected at its opposite end to a bowable spring 110, which in its upward and downward bending movements alternately makes and breaks the contacts 111' and 112' of two opposed switches 111 and 112. The latch member 107 is connected to the movable core 113 of a solenoid including coil 114, which when energized pulls said core 113 downwardly to move latch from an engaging position to its releasing position illustrated. The hooked end 106 of the latch 107 provides a locking projection 106' and a trip arm or projection 107'. The drawing shows the parts of the brake holding and releasing means in released position in which member 104 is drawn upward by the brake release spring 124. The latch 107 has been drawn down to release position and set for a latching action.

The member 104 is connected by means of contractible spring 124 to brake actuating cable 26. When the solenoid coil 98 is energized, the core 102 is drawn down and operates member 104 to pull down on parts 124 and 26 to apply the brake and stop the propeller. In this operation the latch 105 arm of member 104 strikes projection 107' to move latch 107 against stop 109 and tilt member 107 to pull the core 113 upward, thus bringing latch projection 106' above and in engagement with projection 105 to lock the brake in applied position and also bowing spring 110 downward which closes the contacts 111' of switch 111 and breaks the contacts 112' of switch 112, thus de-energizing coil 98 and preparing the circuit to energize coil 114 for a starting operation when demanded by the circuit voltage conditions. As the spring 110 is held between the keeper notches of a fixed keeper 115 and a threaded and adjustable keeper screw 116 and locknut 117, said spring 110 when being forced to bow downward or upwards will be given a certain tension holding in either position. When the spring is bowed in one direction or the other it acts incidentally as a detent to assist in holding member 107 either in locking or released position.

At the close of a stopping operation the contacts of switches 111 and 112 are respectively left engaged and disengaged by the action of spring 110 in preparation for an automatic starting operation, and the coil 98 is at the same time de-energized, but as the armature 93 is pulled down on a fully charged (high voltage) state of the battery, and, as the closing (voltage) coil 88 is always in circuit and remains energized more or less in proportion to the voltage of the battery, any lowered voltage of the battery is sufficient to weaken the voltage coil 88 so that the magnetic tension of said coil 88 can no longer hold the armature 93 attracted against the pull of its spring 93', whereby said armature is operated to disconnect contacts 93', 94 and connect contacts 118, 119, and as switch members 111, 111' are connected at this time, a circuit is completed for the flow of current to the coil 120 of a starting circuit. Current will then flow from battery positive through conductors 87 and 95 and armature 93 through contacts 118 and 119, and to coil 120, energizing its core 121 to hold armature 93 upwardly and contacts 118, 119, firmly in connection to prevent sparking, the current passing from coil 120 through conductor 122 to coil 114 which energizes the solenoid armature 113 which swings latch member 107 to the left releasing hook 106' from projection 105 whereby member 104 is rocked upwards by the tension of the brake springs 123 and 124 moving the solenoid core 102 upwards. In this action spring 110 is bent upwardly, allowing engagement of the switch members 112, 112' for the next operation of stopping the windmill, also breaking the circuit at contacts of switch members 111, 111' in order to de-energize the entire starting circuit. Condensers C2 and C3 prevent sparking at the associated contacts 112—112' and 111—111'.

This system of controlling and operating the stopping and starting mechanism has the great advantage of preventing cycling of the battery, as, when, by any reason the voltage drops to any predetermined degree in the circuit, the windmill will be set into operation. For example, any medium or heavy drain of current demanded from the battery, as in the use of motors or any appliances that require medium or large amounts of current, will cause a voltage drop in the circuit and weaken the voltage coil 88, thus releasing armature 93 and energizing the starting circuit to instantly start the windmill to supply current for the appliance or appliances switched into function. This prevents rapid depletion of the battery and adapts the battery to be kept in a fully charged state to supply the current demands for any purpose. Another advantage is that in case of dirty or broken battery terminal connections the machine will be caused to instantly discontinue the charging process by stopping the generator and preventing the burning of lights or any of the controlling apparatus in the circuit, as the resulting voltage in the coil 88 and in the circuit will be increased and establish a sudden stopping action.

The stopping coil 88 is normally active and magnetizing its core 92, but when the battery requires recharging, and as its voltage is low, armature 93 will connect the contacts 118 and 119 causing the releasing of the brake to start the windmill and the generator action.

A switch 125 is provided for connecting a radio R or disconnecting it from the supply circuit. This switch is connected at 125' to cut in the radio. Assuming that the windmill is running, if any objectionable interference noise preventing clear audition occurs the radio auditor may stop the windmill by simply changing the position of the switch from contact position 125' to contact position 125'', causing current to be diverted and pass through a coil 126' from the battery lead 87. A certain magnetic power thus supplied, which energizes core 92 in collaboration with the magnetizing action of voltage coil 88, will be sufficient to attract the armature 93, and engage stopping contacts 93', 94 to close the stopping circuit to stop the windmill and keep it stopped regardless of the state of charge of the battery, and to start the windmill as soon as the radio is switched off, as the coil 88 cannot hold the armature without the cooperation of coil 126, on account of the low voltage of the battery.

A manually operable double throw switch 126 (Figs. 3, 11, 12, 13) is provided in practice on the instrument board or panel of the apparatus for controlling the circuit to change the speed of the propeller and the charging rate of the generator. This switch is normally connected in series with the conductor 62 and comprises a pair of pivoted switch members 131, 132 each pivoted at one end, said switch members being connected for movement in unison by an insulated cross bar or link 132'. The portion of the conductor 62 with which this switch cooperates is broken to provide two branches 127, 127' normally connected by the switch member 131, as shown in Figs. 6, 11, 12 and 13, which switch member is pivoted at its point of connection with the branch 127', which is connected to conductor 66, whereby the flow of current from the generator to the circuit may be controlled by the compound voltage and current regulator in the ways previously described. A by-pass conductor 72' is provided which is extended as a branch from the conductor 72, to which conductor 72' the pivoted end of the switch member 132 is connected. The switch member 132 is normally idle and arranged between two contacts 129, 130 respectively connected with conductor branch 127 and conductor 85. The switch 126 may be moved to the left, as shown in Fig. 12, to disengage member 131 from branch conductor 127 and move it to open position to engage the switch member with contact 129 of said branch conductor. The switch 126 may also be moved to the right, as shown in Fig. 13, to disengage switch member 131 from conductor branch 127 and move it to open position and to engage switch member 132 with contact 130 of conductor 85. When the switch member 126 is moved from its normal position shown in Fig. 11 to its controlling position shown in Fig. 12, the flow of current through conductor 62 to the coils 63, 71 and 86 of the compound voltage and current regulator in the normal ways previously described will be broken and the current from the generator will be diverted and caused to flow through switch member 132, conductor 72' and conductor 72 directly and to and through the cut in and cut out relay and to and through the battery and back to generator negative. The compound voltage and current regulator will thus be rendered inactive and the generator will charge the battery at a high rate governed only by the speed of the propeller, which in turn will be governed in action only by its mechanical governing means. When the switch 126 is moved to the position shown in Fig. 13, the flow of current from the generator through the conductor 62 to the compound voltage and current regulator will be cut off and the generator current will be caused to flow through solenoid 22, conductor 85 and conductors 72 and 72' to the cut in and cut out relay and through the battery and back to generator negative. The current flowing in this manner forces the propeller to be electrically and mechanically governed at a low charging rate not affected by battery conditions or circuit demands.

To the positive pole of the battery is connected a lead 136 which by means of a push button switch 137 may be connected to the lead 62. Through this lead and the switch 137 the current from the battery positive may be passed through lead 62 to motorize the generator from which through lead 83, the current will flow back to battery negative. When the windmill is thrown out of action, and the brake is applied to maintain the propeller in an inoperative state, the closing of switch 137 will cause the flow of current from the battery to the generator with the result of a voltage drop in the circuit and voltage coil 88, so that armature 93 will no longer be held by core 92 and will connect contacts 118 and 119 to operate the starting apparatus and release the brake in the manner hereinbefore described. This mode of releasing the brake and starting the propeller is effected almost instantly, and the propeller commences to run practically as soon as the push button switch 137 is pressed.

From the foregoing description, taken in connection with the drawings, the construction, mode of operation and advantages of my invention will be readily understood and appreciated by those versed in the art without a further and extended description. It is to be understood, of course, that while the construction disclosed herein is preferred, changes in the form, construction and arrangement of the parts, within the scope of the appended claims, may be made, and equivalents employed, without departing from the spirit or sacrificing any of the advantages of the invention.

Having thus described my invention, I claim:

1. In a windmill electric generator, a generator and its shaft, a variable propeller having a starting and idling position in which it is adapted to initially drive the generator shaft until generating action of the generator begins, a medium and high speed running position in which it speeds up the generating action of the generator to a predetermined top generating speed, and a plurality of governing positions between the top speed running position and a maximum wind speed position to which the propeller is adjustable from the top speed running position under increasing wind speeds to reduce its efficiency in proportion to increase in wind speeds so as to maintain the predetermined top speed of the propeller regardless of increasing wind speeds and drive the generator at a substantially constant top speed and generating rate, the propeller being reversely adjustable under reduced but high wind speeds in inverse order from its maximum wind speed governing position to said top speed and running position to keep the generator operating under the reduced but high wind speeds at the top speed generating rate, adjusting means adapting the propeller to be adjusted from top speed and running position to the governing and running positions under increasing wind pressures and reversely under a force opposing the wind pressures, and a force producing means acting on said adjusting means for yieldingly opposing such wind speed adjustments of the propeller and for adjusting it reversely from high to relatively lower wind speed and top speed running and governing positions.

2. In a windmill electric generator, a generator and its shaft, a variable propeller having a starting and idling position in which it is adapted to initially drive the generator shaft until generating action of the generator begins, a medium and top speed running position in which it speeds up the generating action of the generator to a predetermined top generating speed, and a plurality of governing positions to which the propeller is adjustable from the top speed and running position under increasing wind speeds to reduce its efficiency in proportion to increases in wind speeds so as to maintain the predetermined top speed of the propeller regardless of increasing wind speeds and drive the generator at a substantially constant top speed and generating rate, the propeller being reversely adjustable under reduced but high wind speeds in inverse order from maximum wind speed governing positions to said top speed and running position to keep the generator operating under the reduced but high wind speeds at the top speed generating rate, adjusting means adapting the propeller to be adjusted from top speed and running position to the governing and running positions under increasing wind pressures and to be reversely adjusted under relatively reduced wind pressures yieldingly opposing such wind speed adjustments of the propeller and adjusting it reversely from a relatively high to a relatively lower wind speed position when running at top speed governing positions, and means acting on said adjusting means for adjusting the propeller from its starting and idling position to its running and top speed position and vice versa, said means being operative to perform the first-named action when the generator starts generating a current on the initial driving of the generator shaft by the action of the propeller in starting and idling position, and said means being operative to perform the second-named action when the wind speed decreases to such a degree as to render the propeller ineffective to drive the generator at a generating speed.

3. In a windmill electric generator, a generator and its shaft, a variable propeller having a starting and idling position in which it is adapted to initially drive the generator shaft until generating action of the generator begins, a medium and high speed running position in which it progressively speeds up the generating action of the generator to a predetermined top generating speed, and a plurality of governing positions to which the propeller is adjustable from the top speed and running position under increasing wind speeds to reduce its efficiency in proportion to increases in wind speeds so as to maintain the predetermined top speed of the propeller regardless of increasing wind speeds and drive the generator at a substantially constant top speed and generating rate, the propeller being reversely adjustable under reduced but high wind speeds in inverse order from its maximum wind speed governing positions to said top speed and runnnig position to keep the generator operating under the reduced but high wind speeds at the top speed generating rate, adjusting means adapting the propeller to be adjusted from top speed and running position to the governing and running positions under increasing wind pressures, and to be reversely adjusted under relatively reduced wind pressures, a counteracting force producing means acting on the adjusting means for yieldingly opposing such wind speed adjustments of the propeller and adjusting it reversely from high to relatively lower wind speeds at top speed governing positions, a regulator for adjusting the counteracting force producing means to vary its action on the adjusting means and cause the latter to vary the top speed position of the propeller, and means for adjusting the propeller from its starting and idling position to its running and top speed position, said means being operative on an initial driving of the generator shaft through torque thereon when a generating action begins.

4. In a windmill electric generator, a generator and its shaft, a variable propeller having a starting and idling position in which it is adapted to initially drive the generator shaft until generating action of the generator begins, a medium and top speed running position in which it gradually speeds up the generating action of the generator to a predetermined top generating speed, and a plurality of running and governing positions to which the propeller is adjustable from the top speed and running position under increasing wind speeds to reduce its efficiency in proportion to increases in wind speeds so as to maintain the predetermined top speed of the propeller regardless of increasing wind speeds and drive the generator at a substantially constant top speed and generating rate, the propeller being reversely adjustable under reduced but high wind speeds in inverse order from its maximum wind speed governing positions to said top speed and running position to keep the generator operating under the reduced wind speeds at the top speed generating rate, adjusting means adapting the propeller to be adjusted from top speed running position to the governing and running positions under increasing wind pressures and reversely at relatively reduced wind pressures, counteracting force means acting on said adjusting means for yieldingly opposing such wind speed adjustments of the propeller and for adjusting it reversely from high to relatively lower wind speed running and governing positions at reduced wind speeds, and means for varying the effective yielding force of the counteracting means and adjusting the propeller to vary its high top speed position.

5. In a windmill electric generator, a generator and its shaft, an electric circuit including the generator and a battery adapted to be charged thereby, a variable propeller having a starting and idling position, a top speed running position determining the top speed and top generating rate of the generator, and a plurality of running and governing positions to which it is successively adjustable in order under increasing wind speeds and reversibly in order under relatively reduced wind speeds for speed controlling actions maintaining the top speed and charging rate of the generator at and above a wind speed at which the propeller is driven at its determined top speed, adjusting means adapting the propeller when running to shift in the stated order for governing actions under increasing wind pressures and causing the propeller to so shift under such wind pressure, means for applying a counteracting force acting on the adjusting means for yieldingly opposing adjustments of the propeller under increasing wind pressures and causing said adjusting means to reversibly adjust the propeller for controlling actions under relatively reduced wind pressures whereby through such adjusting actions the propeller will be driven at a constant top speed regardless of decreased but high wind pressures and at all higher wind pressures at and above that required to drive the propeller at such top speed, and electrical means acting on the adjusting means in the starting and idling position of the propeller and responsive to the action of the propeller at the beginning of its generating action to cause the adjusting means to adjust the propeller from its idling and starting position to its running and top speed position or to any of the governing positions according to the speed of the wind at the time.

6. In a windmill electric generator, a generator and its shaft, an electric circuit including the generator and a battery adapted to be charged thereby, a variable propeller having a starting and idling position, a running and top speed running position determining the top speed and top generating rate of the generator, and a plurality of running and governing positions to which it is successively adjustable in order under increasing wind speeds and reversibly in order under relatively reduced wind speeds for speed controlling actions maintaining the top speed and charging rate of the generator at and above a wind speed at which the propeller is driven at its determined top speed, adjusting means adapting the propeller when running to shift in the stated order for governing actions under increasing wind pressures and adapting it to be shifted in the reverse order under relatively reduced wind speeds, means acting on said adjusting means for applying a counteracting force against the adjustments of the propeller under progressive wind speeds and for adjusting it reversely under relatively reduced wind pressures whereby through such controlling actions the propeller will be driven at a constant top speed regardless of decreased but high wind pressures and at all high wind pressures at and above that required to drive the propeller at such speed, and a transmission connection between the shaft and propeller including said adjusting means and also including means, operating in the starting and idling position of the propeller and the driving of the generator shaft thereby and the beginning of generating action by the generator and under torque on the shaft, to adjust the propeller from its starting and idling position to its running and top speed position or to any of the governing positions according to the speed of the wind at the time.

7. In a windmill electric generator, a generator and its shaft, a bladed variable pitch propeller having a normal starting and idling pitch position in which it is adapted to initially drive the generator shaft until generating action of the generator begins, a medium and top speed and running pitch position in which it speeds up the generating action of the generator to a predetermined top generating speed, and a plurality of governing pitch positions to which the propeller is adjustable from the top speed running position under increasing wind speeds to reduce its pitch in proportion to increases in wind speeds so as to maintain the predetermined top speed of the propeller regardless of increasing wind speeds and to drive the generator at a substantially constant top speed and generating rate, the propeller being reversely adjustable as to pitch under reduced but high wind speeds in inverse order from its maximum wind speed governing position to said top speed and running position to keep the generator operating under the reduced but high wind speeds at the top speed generating rate, means adapting the propeller to be adjusted from top speed running position to the governing positions under increasing wind pressures and adapting it to be shifted in reverse order at relatively reduced wind speeds, for means yieldably opposing such wind speed adjustments of the propeller and adjusting it reversely from high to relatively lower wind speed governing and top speed running and governing positions, said adjusting means including a transmission and connections between the same and the shaft and blades for driving the shaft from the propeller and adjusting the propeller blades from starting and idling position to top speed and running position, and means for operating said transmission to adjust the blades from idling to top speed pitch position on an initial driving of the shaft through torque thereon when in a starting action generating action begins.

8. In a windmill electric generator, a generator and its shaft, a variable propeller having starting and idling position in which it is adapted to initially drive the generator shaft until generating action of the generator begins, a medium and top speed and running position in which it speeds up the generating action of the generator to a predetermined top generating speed, and a plurality of governing positions to which the propeller is adjustable from the top speed running position under increasing wind speeds to reduce its efficiency in proportion to increases in wind speeds so as to maintain the predetermined top speed of the propeller regardless of increasing wind speed and drive the generator at a substantially constant top speed and generating rate, the propeller being reversely adjustable under reduced but high wind speeds in inverse order from its maximum wind speed governing position to said top speed and running position to keep the generator operating under the reduced but high wind speeds at the top speed generating rate, adjusting means for adapting the propeller to be adjusted from top speed running position to the governing position under increasing wind pressures and adapting it to be adjusted in reverse order at relatively reduced wind speeds, adjusting means yieldingly opposing such wind speed adjustments of the propeller and adjusting it reversely from high to relatively lower wind speed and top speed running and governing positions, and electrical means operative on the initial driving of the generator shaft and through torque on the shaft when generation begins to adjust the propeller from starting and idling to high speed position.

9. In a windmill electric generator, a generator and its shaft, a variable propeller having a starting and idling position in which it is adapted to initially drive the generator shaft until generating action of the generator begins, a medium and top speed and running position in which it speeds up the generating action of the generator to a predetermined top generating speed, and a plurality of governing positions to which the propeller is adjustable at different high wind speeds and relatively lower wind speeds to normally drive the generator at a substantially constant top speed and high generating rate, the propeller also being adjustable to drive the generator at a reduced generating rate, adjusting means adapting the propeller to be adjusted from top speed running position to the normal governing positions under increasing wind pressures, means for yieldingly opposing such wind speed adjustments of the propeller and for adjusting it reversely from high to relatively lower wind speed and top speed normal running and governing positions, an electric circuit including the generator and a battery, and means arranged in said circuit and coupled to said adjusting means and responsive to and when a certain state of charge of the battery is reached to adjust the propeller to drive the generator at the reduced charging rate.

10. In a windmill electric generator, a generator and its shaft, a battery adapted to be charged by the generator, a variable propeller having a starting and idling position in which it is adapted to initially drive the generator shaft until generating action of the generator begins, and a medium top speed and running position in which it speeds up the generating action of the generator to a predetermined top generating speed, and a plurality of governing positions to which the propeller is adjustable at different high wind speeds and relatively lower wind speeds to normally drive the generator at a substantially constant top speed and generating rate, the propeller also being adjustable to drive the generator at a reduced generating rate, adjusting means adapting the propeller to be adjusted from top speed running position to the normal governing positions under increasing wind pressures, means yieldingly opposing such wind speed adjustments of the propeller and adjusting it reversely from high to relatively lower wind speed and top speed normal running and governing positions, an electric circuit including the generator, a battery and a solenoid, said solenoid being coupled to said adjusting means and energizable to adjust the same to cause adjustment of the propeller to drive the generator at the reduced speed and charging rate, and means in said circuit operative at a certain state of charge of the battery to energize the solenoid.

11. In a windmill electric generator, a generator and its shaft, a variable propeller adjustable to drive the generator at a high output rate or a low output rate, adjusting means adapting the propeller when running to shift under progressive wind pressures and for applying a counteracting force acting in opposition to wind pressures and coacting therewith to effect adjustment of the propeller to different running positions to normally drive the generator at a high output rate under different wind pressures, an electric circuit including a service device supplied with current by the generator, and controlling means arranged in said circuit and operatively connected to said adjusting means so as to be responsive to a condition in the circuit to operate said adjusting means to adjust the propeller to drive the generator at the reduced output rate and thereby reduce the amount of current supply to the service device regardless of the prevailing wind pressure acting on the propeller.

12. The combination of an electric generator and its shaft, a windwheel for operating the generator comprising a rotatable and longitudinally shiftable hub and blades carried thereby axially adjustable from a normal starting pitch position to different running pitch positions for driving the generator at high or low charging rates, an electric circuit including a battery adapted to be charged by the generator, a transmission connecting the shaft with the hub and blades and operable by rotatable and longitudinal movements of the hub in one direction under varying wind pressures to adjust the blades to the said different pitch positions, means for opposing the movement of the hub and adjustment of the blades under wind pressures and for moving the hub and blades back toward their normal high speed pitch position against such pressures and to degrees dependent upon the wind, means operating to maintain the hub and blades in their normal starting pitch position in the absence of wind pressures acting thereon or when the windwheel is stopped, and an electrical device arranged in the circuit and coupled to the transmission, said device being responsive to the initial generating action of the generator when the windwheel is started to adjust the blades from normal starting to a running pitch position and said device being also responsive to a state of charge of the battery to adjust the propeller to a pitch position to drive the generator at a low charging rate.

13. The combination of a windmill head including an electric generator, a generator shaft and a rotary propeller hub slidably movable inward and outwardly on the head, an electric circuit including a battery adapted to be charged by the generator, blades mounted on the hub and adjustable by the sliding movements of the hub to vary the speed of the wheel so as to operate the generator at a high or a low charging rate, the hub being slidably movable in one direction under different wind pressures to adjust the blades to operate the generator at a high charging rate, means for yielding opposing such movement of the hub and adjustment of the blades and slidably moving the hub in the opposite direction, and electrical means for controlling the actions of the windwheel to operate the generator at a low charging rate when a certain state in the circuit exists.

14. The combination of an electric generator, a windwheel for operating the generator and having blades automatically adjustable to different pitch angles under different high and relatively lower wind pressures to operate the generator at a high or a low charging rate, an electric circuit including a battery adapted to be charged by the generator, means for governing the adjustment of the blades and regulating the speed of the windmill to secure a substantially uniform speed and high charging rate of the generator, and a solenoid in the circuit energized at a predetermined state of charge of the battery for governing the adjustment of the blades to change the generator action and to operate the generator at a low charging rate and constant medium speed.

15. The combination of an electric generator, an electric circuit including a battery adapted to be charged by the generator, a windwheel for operating the generator comprising a longitudinally shiftable hub and blades mounted thereon and axially adjustable to different pitch angles to maintain a constant speed of the propeller under different wind pressures to adapt it to operate the generator at a high rate and constant speed, means normally active in opposition to and in conjunction with wind pressures to control the adjustment of the blades to normally operate the generator at a high charging rate, and means influenced by conditions in the circuit for electrically governing the windwheel to adjust the blades to operate the generator at a low charging rate.

16. The combination of an electric generator, an electric circuit including a battery adapted to be charged by the generator, a windwheel for operating the generator and comprising an adjustable hub and adjustable blades movable to different pitch angles to vary the speed of the propeller and to adapt it to operate the generator at a high charging rate and constant speed or a low charging rate and constant speed, the hub and blades being adjustable to certain degrees by different and increasing wind pressures to operate the generator at a high speed rate and being adjustable to further degress to change the driving action and drive the generator at a low charging rate, means opposing adjustment of the hub and blades and the constant top speed of the propeller, and electrical means operated by a rate of charge of the generator and conditions in battery for adjusting the hub and blades to the degrees to drive the generator at the low and constant charging rate.

17. The combination of an electric generator, an electric circuit including a battery adapted to be charged by the generator, a windwheel for operating the generator and embodying blades adjustable under wind pressures to reduce their effective areas exposed to the wind pressures, means for yieldingly opposing adjustment of the blades by the wind and operative to adjust the blades on reduction of wind pressures to increase the affective area of the blades exposed to the wind, said means including a transmission and controller for driving the generator and adjusting the blades and governing the windwheel to drive the generator for high or low charge generating actions, a solenoid adapted for operation to adjust the blades in the same direction in which the blades are adjusted by wind pressures to change the generator from high to low charge generating action, and means in the circuit for energizing and controlling the action of the solenoid.

18. The combination of an electric generator, an electric circuit including a battery and adapted to be supplied with current by the generator, a windmill for driving the generator and variable in action to drive the generator at constant high or low charging rates, a mechanical controller operating in conjunction with the wind to govern the action of the windmill to drive the generator at a constant high charging rate, electrical controlling means for governing the action of the windmill to drive the generator at a low charging rate, and switching means controlling the supply of current to the electrical controlling means to throw said means out of action and cause the windmill to be controlled solely by the mechanical controller, or to throw said means into action for cooperation with the mechanical controller for high and low charge controlling actions dependent upon circuit conditions, or to adapt said means for cooperation with the mechanical controller to govern the charging rates regardless of the state of charge of the battery or of the speed of the wind.

19. In a windmill electric generator, a generator and its shaft, an electric circuit including a battery adapted to be charged by the generator, a variable pitch efficiency adjustable propeller for driving the generator at a constant high top speed and charging rate or at a constant but lowered medium top speed and charging rate, mechanical means for changing the pitch of the propeller to shift the propeller under different wind pressures to different positions for more or less speed efficiency coacting or counteracting said wind pressures to establish a governed and constant high top speed and charging rate, means including a solenoid arranged in said circuit and influenced at a certain state of charge of the battery to magnetically augment the action of the wind pressure on the propeller and controlling said adjusting means to shift the propeller to drive the generator at a lowered charging rate at different wind pressures.

20. In a windmill electric generator, a generator and its shaft, an electric circuit including a battery adapted to be charged by the generator, a variable pitch efficiency adjustable propeller blade pitch adjusting means, said propeller including a hub mounted on the shaft to slide backwards on said shaft by the action of increasing wind pressures and operable thereby to actuate the blade adjusting means to reduce the efficiency of the propeller, a spring for yieldingly opposing the backwards sliding action of the hub and for sliding it forwardly the hub being operable on its forward sliding movements to actuate the blade pitch adjusting means to increase the efficiency of the propeller at relatively reduced wind pressures, blades adjustable as to pitch efficiency by such movements of the hub, and electromagnetic means controlled by conditions in the electric circuit for regulating the tension of the spring.

21. In a windmill electric generator, a generator and its shaft, an electric circuit and a battery to be charged by the generator, a variable pitch efficiently propeller including a hub slidable on the shaft backwards and forwards, and blades adjustable respectively to be decreased and increased degrees of efficiency respectively by such movements of the hub, said hub being slidable backwards by action of wind pressures, an adjustable spring for yieldingly opposing and backwards sliding movements of said hub on the shaft and sliding it forward under relatively high and low wind pressures to vary the speed efficiency of the propeller to normally drive the propeller at a predetermined high top speed and the generator at a high charging rate, and electrical means including a solenoid to coact with the wind pressure to slide the hub backwards to a degree to reduce the speed efficiency of the propeller to obtain lower charging rates of the generator, according to the circuit and battery conditions, at medium or any high speed of the wind.

22. The combination of an electric generator, an electric circuit including a battery adapted to be charged by the generator, a windwheel comprising a hub, adjustable blades, and adjustable blade pitch angle adjusting means conjointly shiftable to different working positions to change the pitch angles of the blades to vary the propeller speed, said hub, blades and pitch angle adjusting means being shiftable under varying but relatively increasing wind pressures to working positions to proportionately decrease the propeller speed so as to operate the generator at a predetermined constant charging rate, counteracting adjusting means for yieldingly opposing such shifting movements of the hub, blades and blade adjusting means and shifting them to working positions to increase the propeller speed at relatively reduced wind pressures so as to operate the generator to maintain the predetermined charging rate, and means influenced by a condition in the electric circuit to vary the operation of the counteracting adjusting means to effect an adjustment of the hub, blades and pitch angle adjusting means to working positions to cause the propeller to drive the generator at a lower charging rate than said predetermined constant charging rate.

23. The combination of an electric generator, an electric circuit including a battery supplied with current by the generator, a windwheel comprising a longitudinally shiftable hub and axially adjustable blades carried thereby, shifting means connecting the hub with the blades for adjusting the blades axially in one direction or the other on the sliding movement of the hub in one direction or the other, the hub being movable under wind pressures in one direction to adjust the blades to different pitch angles to compensate for different wind velocities and drive the generator at a high and constant charging rate, and said hub being movable further in the same direction to adjust the blades to a pitch angle to drive the generator at a low speed and charging rate, means acting on the hub for producing a force counteracting the wind force to yieldingly resist movement of the hub and blades under wind pressures and to move them oppositely, when such force is greater at any time than a wind pressure, to maintain the propeller speed to drive the generator at the high charging rate, and means influenced by a condition in the electric circuit to adjust the hub and blades to drive the generator at the low charging rate.

24. The combination of an electric generator, an electric circuit including a battery adapted to be charged by the generator, a windwheel for operating the generator and comprising an adjustable hub and adjustable blades movable to different pitch angles to vary the speed of the propeller and to adapt it to operate the generator at a high charging rate and constant top speed or a low charging rate and constant speed, the hub and blades being adjustable to certain degrees by different and relatively increasing wind pressures to operate the generator at the high charging rate and being adjustable to a further degree to change the pitch angle of the blades to drive the generator at a low charging rate, means for opposing adjustment of the hub and blades under increasing wind forces and adjusting them contra to the wind forces in the prevalence of relatively lower wind forces to maintain the constant top speed of the propeller, and electrical means responsive to a condition in the circuit and operatively connected to the hub and blades for adjusting the hub and blades to the degree to change the pitch of the blades to drive the generator at the low charging rate.

25. The combination of an electric generator, a windwheel having blades adjustable to pitch angles for operating the generator at a high charging rate or a low charging rate, an electric circuit including a battery adapted to be charged by the generator, mechanical controlling means for adjusting the blades to govern the action of the windwheel to adapt it to normally operate the generator at a high constant speed and charging rate under varying high and lower wind pressures and operable for adjusting the blades to change the action of the windwheel to adapt it to operate the generator at a low constant speed and charging rate, and electric means dependent upon the state of charge of the battery for actuating said mechanical controlling means to adjust the blades to so change the charging rate of the generator.

26. The combination of an electric generator, an electric circuit including a battery supplied with current by the generator, a windwheel for operating the generator comprising a rotary casing bodily shiftable in opposite directions and shiftable in one of said directions under wind pressures and in the opposite direction under a counteracting force, and blades axially adjustable to reduce or increase their efficiencies respectively under said shifting movement of the casing to compensate for varying wind speeds to normally drive the generator at a constant high charging rate, said casing and blades being further adjustable in the first named direction to change the action of the windmill from a high charging rate action to a low charging rate action and vice versa, a mechanical driving and controlling connection between the shaft, propeller casing and blades for adjusting the blades and driving the shaft, resilient means for opposing a resistance to the shifting of the casing and adjustment of the blades under wind pressures, and a solenoid energized by circuit conditions for shifting the casing in coaction with the wind and in opposition to the resilient means to adjust the blades to drive the generator at the low charging rate.

27. The combination of an electric generator, a variable propeller for operating the generator, an electric circuit including a battery adapted to be charged by the generator, mechanical means controlling the propeller to adapt the propeller to operate the generator at a high or a low charging rate, electrical means controlling the propeller when a certain condition exists in the electric circuit to adapt the propeller to operate the generator at a low charging rate, and manually controllable means for rendering the electrical controlling means inoperative and adapting the windmill to be controlled in action solely by the mechanical controlling means.

28. The combination of an electric generator including an electric controlling circuit, a battery adapted to be supplied with current by the generator, a variable propeller variable in action for driving the generator at high or low charging rates, a mechanical controlling means operative to govern the action of the variable propeller to drive the generator at a high or a low charging rate, a solenoid controlled means in the circuit governing the action of the propeller to drive the generator at a low charging rate, automatic electric control means in the circuit governing the circuit to normally allow the battery to be charged at a high or a low charging rate and operative to cause the adjusting means to adjust the propeller to drive the generator at a low charging rate when a certain condition exists in the circuit, and a switch in the circuit having two circuit controlling positions in one of which it renders the automatic electric means effective for such governing actions and in the other of which it renders said automatic electric means inoperative and controls the circuit so as to adapt the propeller to be controlled in action by the mechanical or solenoid means.

CHARLES FUMAGALLI.

REFERENCES CITED

The following references are of record in the file of this patent:

UNITED STATES PATENTS

| Number | Name | Date |
|---|---|---|
| 1,114,759 | Heyroth | Oct. 27, 1914 |
| 1,125,783 | Waters | Jan. 19, 1915 |
| 1,131,434 | Snee et al. | Mar. 9, 1915 |
| 1,165,418 | Kerr | Dec. 28, 1915 |
| 1,362,753 | Sperry | Dec. 21, 1920 |
| 2,159,886 | Collin | May 23, 1939 |
| 2,179,885 | Fumagalli | Nov. 14, 1939 |
| 2,360,792 | Putnam | Oct. 17, 1944 |
| 2,363,850 | Bany | Nov. 28, 1944 |
| 2,470,797 | Thomas | May 24, 1949 |